(12) United States Patent
Tanaka et al.

(10) Patent No.: US 12,332,493 B2
(45) Date of Patent: Jun. 17, 2025

(54) SPLIT CAMERA LENS AND ASSEMBLY METHOD THEREOF, CAMERA MODULE, AND TERMINAL DEVICE

(71) Applicant: NINGBO SUNNY OPOTECH CO., LTD., Zhejiang (CN)

(72) Inventors: Takehiko Tanaka, Zhejiang (CN); Zhewen Mei, Zhejiang (CN); Haipeng Pei, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 624 days.

(21) Appl. No.: 17/635,495

(22) PCT Filed: Jul. 8, 2020

(86) PCT No.: PCT/CN2020/100788
§ 371 (c)(1),
(2) Date: Feb. 15, 2022

(87) PCT Pub. No.: WO2021/031732
PCT Pub. Date: Feb. 25, 2021

(65) Prior Publication Data
US 2022/0291473 A1 Sep. 15, 2022

(30) Foreign Application Priority Data

Aug. 16, 2019 (CN) .......................... 201910757388.2
Aug. 16, 2019 (CN) .......................... 201921330919.1

(51) Int. Cl.
*G02B 7/02* (2021.01)
*G02B 13/00* (2006.01)
*G03B 30/00* (2021.01)

(52) U.S. Cl.
CPC ............. *G02B 7/021* (2013.01); *G02B 7/023* (2013.01); *G02B 7/025* (2013.01); *G03B 30/00* (2021.01); *G02B 13/0045* (2013.01)

(58) Field of Classification Search
None
See application file for complete search history.

(56) References Cited

U.S. PATENT DOCUMENTS

| | | | |
|---|---|---|---|
| 10,025,063 B2 | 7/2018 | Gutierrez | |
| 2015/0195439 A1* | 7/2015 | Miller | H04N 23/685 348/208.7 |

(Continued)

FOREIGN PATENT DOCUMENTS

| | | |
|---|---|---|
| CN | 101052909 | 10/2007 |
| CN | 105445885 | 3/2016 |

(Continued)

OTHER PUBLICATIONS

International Search Report issued Sep. 28, 2020, in International (PCT) Application No. PCT/CN2020/100788, with English translation.

(Continued)

*Primary Examiner* — Robert E. Tallman
(74) *Attorney, Agent, or Firm* — Wenderoth, Lind & Ponack, L.L.P.

(57) ABSTRACT

Disclosed are a split camera lens (20) and an assembly method thereof, a camera module (10), and a terminal device (100). The split camera lens (20) includes: a first lens portion (21) including a first optical lens (211), and a second lens portion (22); wherein the first lens portion (21) is assembled on the second lens portion (22), and the second lens portion (22) includes a lens barrel (222) and at least one second optical lens (221) mounted in the lens barrel (222); and the second optical lens (221) at the topmost side is completely exposed on the top of the lens barrel (222), thus, a "lens (Continued)

barrel top face" structure of the first lens portion (21) and the second lens portion (22) is removed so as to enlarge an adjustment range of the split camera lens (20). Furthermore, in case that the camera module (10) including the split camera lens (20) is assembled on the terminal device (100), an optical zone (212) of the first optical lens (211) may be adjacent to the top of a through hole (810) of a display screen (81) so as to obtain a larger field angle and light flux, thereby ensuring that the camera module (10) has a high imaging quality.

19 Claims, 10 Drawing Sheets

(56) References Cited

U.S. PATENT DOCUMENTS

| | | | | |
|---|---|---|---|---|
| 2015/0293330 | A1* | 10/2015 | Gutierrez | G03B 43/00 359/811 |
| 2017/0160509 | A1 | 6/2017 | Wang et al. | |
| 2018/0164531 | A1 | 6/2018 | Wei | |
| 2019/0212517 | A1 | 7/2019 | Wang et al. | |
| 2019/0235140 | A1 | 8/2019 | Chou | |

FOREIGN PATENT DOCUMENTS

| | | |
|---|---|---|
| CN | 105445889 | 3/2016 |
| CN | 106461901 | 2/2017 |
| CN | 206209175 | 5/2017 |
| CN | 108627939 | 10/2018 |
| CN | 208367292 | 1/2019 |
| CN | 208432778 | 1/2019 |
| CN | 110095848 | 8/2019 |
| CN | 210534409 | 5/2020 |
| JP | 2010-243961 | 10/2010 |
| TW | 200909900 | 3/2009 |

OTHER PUBLICATIONS

Extended European Search Report issued Sep. 29, 2022 in corresponding European Patent Application No. 20854246.4.

* cited by examiner

SPLIT CAMERA LENS AND ASSEMBLY METHOD THEREOF, CAMERA MODULE, AND TERMINAL DEVICE

TECHNICAL FIELD

This application relates to field of camera modules, and particularly to a split camera lens and assembly method thereof, a camera module and a terminal device.

BACKGROUND ART

With the popularization of mobile electronic devices, the related technologies of camera modules used in the mobile electronic devices to help users obtain images (such as videos or images) have been developed and advanced rapidly. And, in recent years, camera modules have been widely used in many fields such as medical treatment, security and protection, industrial production and so on.

In the field of consumer electronics (for example, in the field of smart phones), the front camera module is an indispensable component. The front camera module and the display screen of the terminal device are arranged on a same side to meet the needs of consumers such as selfies. However, the ever-increasing "screen-to-body ratio" puts forward higher and higher requirements on the structure and layout of the front camera module. In order to reduce the impact of the front camera module on increasing the "screen-to-body ratio", different manufacturers have developed a variety of solutions from different angles.

One solution is to provide a through hole on the display screen of the terminal device. Particularly, in order to hide the front camera module, some manufacturers choose to provide a U-shaped hole at the top of the display screen of the terminal device, and place the front camera module, earpiece and other sensing devices in the U-shaped hole. However, since the volume of the front camera module is the largest in the front sensors, a larger U-shaped hole is required, which has a greater impact on the "screen-to-body ratio".

In order to reduce the impact of openings on increasing the "screen-to-body ratio", some manufacturers changed the U-shaped holes to drop-shaped, but due to the limitations of the structure of the front camera module and the limitations of the screen opening process, the openings cannot be made smaller.

Some manufacturers choose to provide a circular or elliptical opening on an LCD or OLED display. On one hand, the size of the openings is still large; on the other hand, when the terminal device is displaying with the screen, the opening appears obtrusive, which affects the user experience.

There are also some manufacturers who propose a solution for arranging the camera module directly below the screen, and an image is formed by the front camera module by penetrating through the screen. However, the imaging quality of the front camera module in such a solution cannot meet the needs of users.

Some manufacturers choose to provide a blind hole on the screen of the terminal device, and an image is formed by the front camera module by penetrating through the blind hole, herein the blind hole refers to removing the lower light transmittance layer and non-essential layer in the area corresponding to the front camera module on the display screen, so as to increase light transmittance. Although this solution balances the light transmittance and the aperture size, the light transmittance is still not high enough to achieve better imaging quality.

Therefore, there is a need for an improved structure and arrangement of the front camera module, so that the "screen-to-body ratio" of the terminal device may be increased, and the front camera module brings a higher imaging quality.

CONTENTS OF THE INVENTION

The main object of this application is to provide a split camera lens and an assembly method thereof, a camera module and a terminal device, wherein the structure of the split camera lens of the camera module is improved, so that when the camera module is configured as a front camera module of the terminal device, the aperture size required by the display screen of the terminal device may be reduced to increase the "screen-to-body ratio" of the terminal device, and the camera module has a relatively high imaging quality.

Another object of the present application is to provide a split camera lens and an assembly method thereof, a camera module and a terminal device, wherein the split optical lens is not provided with a "lens barrel top face" structure between its first lens portion and second lens portion, thereby increasing the adjustment range of the split camera lens.

Another object of the present application is to provide a split camera lens and an assembly method thereof, a camera module and a terminal device, wherein since the "lens barrel top face" structure is not provided, the design freedom for the structural zone of the first optical lens of the first lens portion and the second optical lens at the topmost side of the second lens portion is improved. Particularly, the thickness size of the structural zone of the first optical lens and the second optical lens at the topmost side may be increased, so that the first lens portion and the second lens portion have greater adjustment gap.

Another object of the present application is to provide a split camera lens and an assembly method thereof, a camera module and a terminal device, wherein the second lens portion includes a lens barrel and at least one second optical lens mounted in the lens barrel, wherein the second optical lens at the topmost side is completely exposed on the top of the lens barrel, so as to form a structural configuration in which the first lens portion and the second lens portion are not provided with the "lens barrel top face" structure.

Another object of the present application is to provide a split camera lens and an assembly method thereof, a camera module and a terminal device, wherein the first optical lens of the first lens portion includes an optical zone and a structural zone surrounding the optical zone, and the optical zone includes a convex portion protruding and extending from the structural zone, and when the optical lens is assembled in the terminal device, the convex portion of the first optical lens is fitted into a through hole of a display screen of the terminal device, so that the optical zone of the first optical lens can be adjacent to the top of the through hole to obtain a larger field angle and light flux, thereby ensuring the camera module to have a high imaging quality.

Another object of the present application is to provide a split camera lens and an assembly method thereof, a camera module and a terminal device, wherein since there is no "lens barrel top face" structure between the first lens portion and the second lens portion, the height difference between the optical zone and the structural zone of the first optical lens of the first lens portion may be increased, so that when the optical lenses is assembled in the through hole of the display screen of the terminal device, the optical zone of the first optical lens can be closer to the top of the through hole to obtain a larger field angle and light flux, thereby ensuring that the camera module has a higher imaging quality.

Another object of the present application is to provide a split camera lens and an assembly method thereof, a camera module and a terminal device, wherein the convex portion of the first optical lens has a relatively small lateral size, so that the front camera module is suitable for a display screen with a small through hole, thereby improving the "screen-to-body ratio" of the terminal device.

Another object of the present application is to provide a split camera lens and an assembly method thereof, a camera module and a terminal device, wherein a shape of a sidewall of the convex portion is adapted to the shape of the through hole of the display screen, so that when the optical lens is assembled in the through hole of the display screen, the convex portion can be fitted into the through hole.

Another object of the present application is to provide a split camera lens and an assembly method thereof, a camera module and a terminal device, wherein the at least one second optical lens is mounted in the lens barrel from bottom to top in an upside-down manner, and in this way, the yield and efficiency of assembly are improved.

Another object of the present application is to provide a split camera lens and an assembly method thereof, a camera module and a terminal device, wherein the first lens portion is assembled to the second lens portion by means of active optical alignment (AOA), and in this way, the optical performance and assembly accuracy and efficiency of the split camera lens are improved.

Other advantages and features of the present application will become obvious from the following description, and may be achieved by means and combinations particularly pointed out in the claims.

In order to achieve at least one of the above objects or advantages, the present application provides a split camera lens, which includes:
  a first lens portion including a first optical lens; and
  a second lens portion including a lens barrel and at least one second optical lens mounted in the lens barrel, wherein an inner diameter of the lens barrel is large at the top and small at the bottom, and the second optical lens at the topmost side is completely exposed on the top of the lens barrel;
  wherein there is an adjustment gap between the first lens portion and the second lens portion, and the first lens portion is attached to the second optical lens at the topmost side through an adhesive.

In the split camera lens according to the present application, the first optical lens is attached to the second optical lens at the topmost side by the adhesive.

In the split camera lens according to the present application, the lens barrel includes a lens barrel main body of which an inner diameter decreases from top to bottom, and a supporting platform which protrudes and extends from the bottom area of the lens barrel main body, and the at least one second optical lens is mounted in the lens barrel main body from bottom to top in an upside-down manner, and the second optical lens at the bottommost side is mounted on the supporting platform, and the top of the lens barrel main body has an opening so that the second optical lens at the topmost side is completely exposed.

In the split camera lens according to the present application, a lower end surface of the lens barrel main body is lower than a lower end surface of the second optical lens at the bottommost side.

In the split camera lens according to the present application, an upper end surface of the lens barrel main body is higher than an upper end surface of the second optical lens at the topmost side.

In the split camera lens according to the present application, an upper end surface of the first optical lens is higher than an upper end surface of the lens barrel main body.

In the split camera lens according to the present application, a ratio of a clear aperture of the first optical lens to a clear aperture of the second optical lens at the topmost side is 0.8-1.25.

In the split camera lens according to the present application, a lateral size of the first optical lens is smaller than a lateral size of the second optical lens at the topmost side.

In the split camera lens according to the present application, at least some of the second optical lenses are fitted with each other.

In the split camera lens according to the present application, a lateral size of the second optical lens at the topmost side is larger than a lateral size of the second optical lens at the bottommost side.

In the split camera lens according to the present application, the second optical lens at the topmost side includes a mounting platform concavely formed on the upper end surface of the second optical lens, and the mounting platform is configured to mount the first optical lens thereon.

In the split camera lens according to the present application, the second optical lens at the topmost side includes a mounting platform protruded and formed on the upper end surface of the second optical lens, and the mounting platform is configured to mount the first optical lens thereon.

In the split camera lens according to the present application, the first optical lens includes an optical zone and a structural zone surrounding the optical zone, wherein the optical zone includes a convex portion protruding and extending from the structural zone.

In the split camera lens according to the present application, a diameter of the convex portion is not greater than 1.2 mm.

In the split camera lens according to the present application, an angle between a sidewall of the convex portion and an optical axis configured by the split camera lens is less than 15°.

In the split camera lens according to the present application, the sidewall is substantially parallel to the optical axis.

In the split camera lens according to the present application, the sidewall of the convex portion is substantially perpendicular to the upper surface of the structural zone.

In the split camera lens according to the present application, the highest point of the convex portion protrudes from the lower surface of the structural zone by at least 0.3-1.2 mm.

In the split camera lens according to the present application, a total height of the first optical lens is 0.4-1.6 mm.

In the split camera lens according to the present application, an upper side of the optical zone is a convex surface, and a lower side opposite to the upper side thereof is a concave surface.

In the split camera lens according to the present application, the first optical lens is a plastic lens.

In the split camera lens according to the present application, the first optical lens is a glass lens.

In the split camera lens according to the present application, the Abbe number of the refractive index of the glass lens is 50-71.

In the split camera lens according to the present application, the refractive index of the glass lens is 1.48-1.55.

In the split camera lens according to the present application, the upper surface of the convex portion is a convex surface.

In the split camera lens according to the present application, the first optical lens further includes a light shielding layer arranged in a non-optical effective zone of the first optical lens.

In the split camera lens according to the present application, when the lateral size of the first optical lens corresponds to the second optical lens at the topmost side, an area covered by the light shielding layer includes the upper surface and the side surface of the structural zone of the first optical lens, and the sidewall of the convex portion.

In the split camera lens according to the present application, when the lateral size of the first optical lens is smaller than that of the second optical lens at the topmost side, an area covered by the light shielding layer includes the upper surface and the side surface of the structural zone of the first optical lens, the sidewall of the convex portion, and at least part of the upper surface of the second optical lens at the topmost side.

In the split camera lens according to the present application, the light-shielding layer further covers a transition area between the sidewall of the convex portion and the upper surface thereof, wherein a length of the transition area in a direction from the sidewall of the convex portion to the center of the convex portion is 0.03-0.05 mm.

In the split camera lens according to the present application, the material of the light shielding layer is an ink material.

In the split camera lens according to the present application, the first lens portion is mounted on the second lens portion by means of active optical alignment.

In the split camera lens according to the present application, the lower surface of the first optical lens is higher than the upper end surface of the lens barrel.

In the split camera lens according to the present application, the split camera lens further includes a protective element arranged on the second optical lens at the topmost side.

In the split camera lens according to the present application, a cross section of the split camera lens has a "D" shape.

According to another aspect of the present application, the present application also provides a camera module, which includes:
the split camera lens as described above; and
a photosensitive assembly, wherein the split camera lens is held on a photosensitive path of a photosensitive assembly.

In the camera module according to the present application, the camera module further includes a driving element, wherein the driving element is mounted in the photosensitive assembly, and the optical lens is mounted in the driving element.

According to another aspect of the present application, there also provides a terminal device, which includes:
a terminal main body including a display screen; and
a camera module, wherein the camera module includes:
the split camera lens as described above; and
a photosensitive assembly, wherein the split camera lens is held on a photosensitive path of a photosensitive assembly;
wherein the camera module is mounted on a same side as the display screen of the terminal main body so as to be configured as a front camera module;
wherein the display screen has a through hole formed through the display screen, and an inner diameter of the through hole is slightly larger than the lateral size of the convex portion, and when the camera module is mounted on the front side of the terminal main body, the convex portion of the first optical lens is fitted into the through hole.

In the terminal device according to the present application, a distance between the upper surface of the convex portion and a top end of the through hole is in a range of 0.01-0.5 mm.

In the terminal device according to the present application, the through hole is a stepped hole, so that when the camera module and the display screen are mounted on the same side of the terminal main body, the convex portion of the first optical lens and part of the structural zone are fitted into the through hole.

According to another aspect of the present application, there also provides a method for assembling a split camera lens, which includes:
providing a lens barrel, at least one second optical lens, and a first lens portion including a first optical lens, wherein the lens barrel includes a lens barrel main body of which an inner diameter decreases from top to bottom and a supporting platform which protrudes and extends from a bottom area of the lens barrel main body;
mounting the at least one second optical lens in the lens barrel main body from bottom to top in an upside-down manner, so as to form a second lens portion, wherein the second optical lens at the topmost side is completely exposed on the top of the lens barrel;
pre-positioning the first lens portion, the second lens portion and a photosensitive assembly along a direction of an optical axis;
adjusting a relative positional relationship between the first lens portion and the second lens portion by means of active optical alignment; and
fixing the first lens portion to the second lens portion to form the split camera lens.

In the method for assembling a split camera lens according to the present application, adjusting the relative positional relationship between the first lens portion and the second lens portion by means of active optical alignment includes:
adjusting the relative positional relationship between the first lens portion and the second lens portion based on imaging quality of an image acquired by an imaging system consisting of the first optical lens, the second lens portion and the photosensitive assembly.

In the method for assembling a split camera lens according to the present application, fixing the first lens portion to the second lens portion to form the split camera lens includes:
applying an adhesive between the first optical lens and the second optical lens at the topmost side; and
curing the adhesive to fixedly attach the first optical lens to the second optical lens at the topmost side, thereby fixing the first lens portion to the second lens portion.

Further objects and advantages of this application will be fully embodied after understanding the following description and drawings.

These and other objects, features and advantages of this application are fully embodied by the following detailed description, drawings and claims.

BRIEF DESCRIPTION OF THE DRAWINGS

The above and other objects, features, and advantages of the present application will become more apparent from more detailed description of the embodiments of the present application in conjunction with the accompanying drawings. The accompanying drawings are used to provide a further understanding of the embodiments of the application, and constitute a part of the specification. Together with the embodiments of the application, they are used to explain the application, and do not constitute a limitation to the application. In the drawings, the same reference numerals generally represent the same components or steps.

SPECIFIC EXAMPLES

Hereinafter, exemplary examples according to the present application will be described in detail with reference to the accompanying drawings. Obviously, the described examples are only some of the examples according to the present application, rather than all the examples according to the present application. It should be understood that, the present application is not limited by the exemplary examples described herein.

Principal of the Invention

As mentioned above, in order to reduce the impact of the front camera module on increasing the "screen-to-body ratio", different manufacturers have developed a variety of solutions from different angles. However, these solutions are more or less unable to simultaneously meet the requirements of continuing to increase the "screen-to-body ratio" and ensuring the imaging quality of the front camera module.

Figure 1:
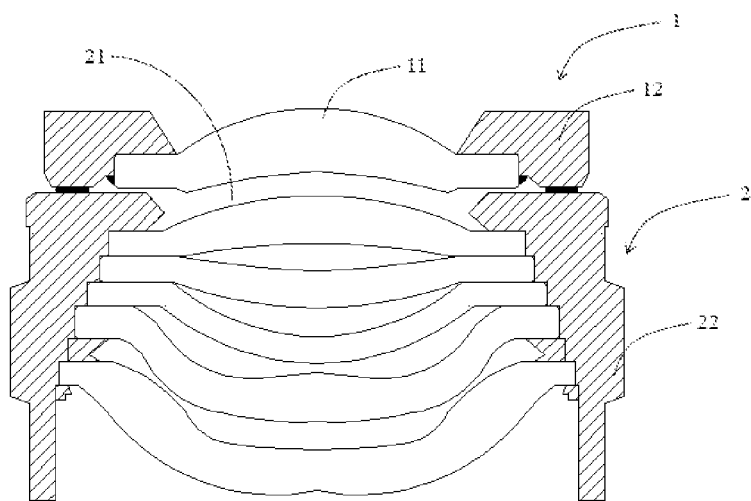
FIG. 1 shows a schematic diagram of a structure of a conventional split camera lens.

Particularly, a conventional front camera module usually includes a photosensitive assembly for photosensitive imaging, and an optical lens held on a photosensitive path of the photosensitive assembly. According to the structure, the optical lens can be categorized to an integrated camera lens and a split camera lens. FIG. 1 shows a schematic diagram of a structure of a conventional split camera lens. As shown in FIG. 1, the split camera lens includes a first lens portion 1 and a second lens portion 2, and the first lens portion 1 includes a first optical lens 11 (in some conventional split optical lens, the first lens portion 1 also includes a first lens barrel 12 for accommodating the first optical lens 11), and the second lens portion 2 includes at least one second optical lens 21 and a second lens barrel 22 for accommodating at least one optical lens 21.

Those of ordinary skill in the art should know that for an optical system, under ideal conditions, a distance between optical zones of the first optical lens 11 of the first lens portion 1 and the second optical lens 21 at the topmost side of the second lens portion 2 is relatively determinate. However, in an actual production process, the optical lens itself (including the first optical lens 11 and the second optical lens 21) has a limitation of molding accuracy, and there is a limitation of assembly accuracy between a lens and a lens barrel, so that the distance between the optical zones of the first optical lens 11 and the second optical lens 21 at the topmost side of the second lens portion 2 is indeterminate. Therefore, in a split camera lens, it is necessary to reserve an adjustment gap between the first lens portion 1 and the second lens portion 2.

Particularly, the adjustment gap is the smallest gap between the first lens portion 1 and the second lens portion 2. In the actual assembly process, the adjustment gap needs to be greater than 10 microns (preferably, a range of the adjustment gap is 30-100 microns). Since relative positions between the first lens portion 1 and the second lens portion 2 will be adjusted according to the imaging results of the split camera lens, the adjustment gap between the first lens portion 1 and the second lens portion 2 will change, however, after adjusting and fixing the relative positions of the first lens portion 1 and the second lens portion 2, the adjustment gap of most split camera lens will still be greater than 10 microns, and the adjustment gap of some split camera lens will be 30-100 microns.

However, as shown in FIG. 1, in a conventional split camera lens, the first lens portion 1 is mounted on an upper surface of the second lens barrel 22, i.e., between the first optical lens 11 and the second optical lens next to it. There is a "top face" of the second lens barrel 22 between the first optical lens 11 and its adjacent second optical lens 21. The existence of the "lens barrel top face" structure inevitably reduces the adjustment gap, affecting the adjustment of the split camera lens, thereby affecting the adjustment quality and assembly yield of the lenses.

Further, the "lens barrel top face" structure has a certain thickness. Therefore, under a premise of ensuring the adjustment gap as much as possible, the design freedom of the second optical lens 21 of the second lens portion 2 is limited, especially several second optical lens 22 closest to the first optical lens 11. In particular, in order to reserve space for the "lens barrel top face" structure, a structural zone of the second optical lens 21 adjacent to the first optical lens 11 needs to be shifted toward an image side of the camera lens. Such a design reduces the thickness of the connecting position between the structural zone and the optical zone of the second optical lens 21 at the topmost side, thereby increasing the difficulty of molding the second optical lens 21 at the topmost side. Such a design will also cause a surface shape of an imaging surface of the optical zone of the second optical lens 21 and a manufacturing tolerance of the structural zone to become larger, thereby reducing the imaging quality of the split camera lens.

In addition, the structure of "lens barrel top face" raises a mounting base surface of the first optical lens 11, so that a height design of the first optical lens 11 for extending upward is affected. It should be understood that, an overall height of the optical system of the split camera lens is within a relatively determined range, and the existence of the "lens barrel top face" structure is equivalent to raising the mounting base surface of the first lens portion 1. Therefore, the height of the first lens portion 1 needs to be reduced to meet the overall height requirement of the optical system. The influence of the "lens barrel top face" structure on the height design of the first lens portion 1 will be reflected when the split camera lens is assembled in a terminal device (for example, a smart phone).

Figure 2:
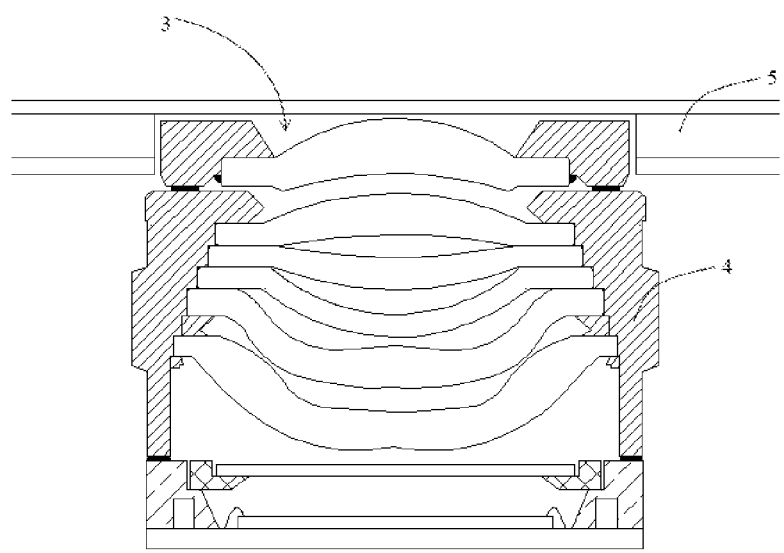
FIG. 2 shows a schematic diagram of a conventional split camera lens assembled in a terminal device.
Figure 3:
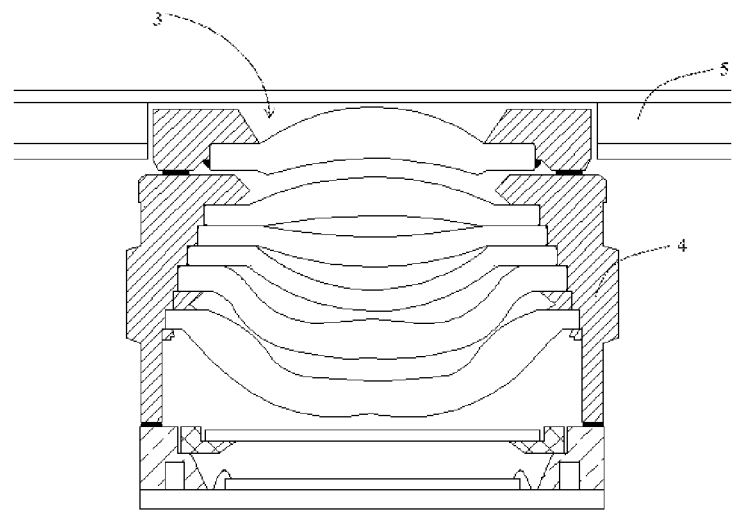
FIG. 3 shows another schematic diagram of a conventional split camera lens assembled in a terminal device.

FIG. 2 shows a schematic diagram of a conventional split camera lens assembled in a terminal device. FIG. 3 shows another schematic diagram of a conventional split camera lens assembled in a terminal device. In the assembly manner as shown in the schematic diagrams of FIGS. 2 and 3, an opening 3 of a display screen of the terminal device at least needs to be larger than a certain size to meet the requirements of the field angle and the amount of entering light of the front camera module 4, which results in a too large opening of the display screen 5 of the terminal device, thereby affecting the improvement of the "screen-to-body ratio", aesthetics and user experience.

In view of the above technical problems, the basic idea of this application is to remove the "lens barrel top face" structure of the first lens portion and the second lens portion; thus on one hand, the adjustment range of the split camera lens may be made larger; and on the other hand, the influence of the "lens barrel top face" structure on the optical design (especially the height design) of the first optical lens is eliminated, so that the optical zone of the first optical lens may be relatively more protruding than its structural zone; as a result, when the split camera lens is assembled in the terminal device in such a way that the first optical lens is fitted into a through hole of the display screen of the terminal device, the optical zone of the first optical lens may be adjacent to the top of the through hole to obtain a larger field angle and light flux, thereby ensuring that the camera module has a higher imaging quality.

Based on this, the present application proposes a split camera lens, which includes a first lens portion including a first optical lens, and a second lens portion, wherein the first lens portion is assembled to the second lens portion. The second lens portion includes a lens barrel and at least one second optical lens mounted in the lens barrel, and the second optical lens at the topmost side is completely exposed on the top of the lens barrel. In this way, the "lens barrel top face" structure of the first lens portion and the second lens portion is removed, thus on one hand, the adjustment range of the split camera lens becomes larger; and on the other hand, the influence of the "lens barrel top face" structure on the optical design (especially the height design) of the first optical lens is eliminated, so that the optical zone of the first optical lens may be relatively more protruding than its structural zone. And as a result, when the split camera lens is assembled in the terminal device in such a way that the first optical lens is fitted into the through hole of the display screen of the terminal device, the optical zone of the first optical lens can be closer to the top of the through hole to obtain a larger field angle and light flux, thereby ensuring that the camera module has a higher imaging quality.

After introducing the basic principles of the present application, various non-limiting examples of the present application will be described in detail below with reference to the accompanying drawings.

Exemplary Camera Module and Split Camera Lens Thereof

Figure 4:
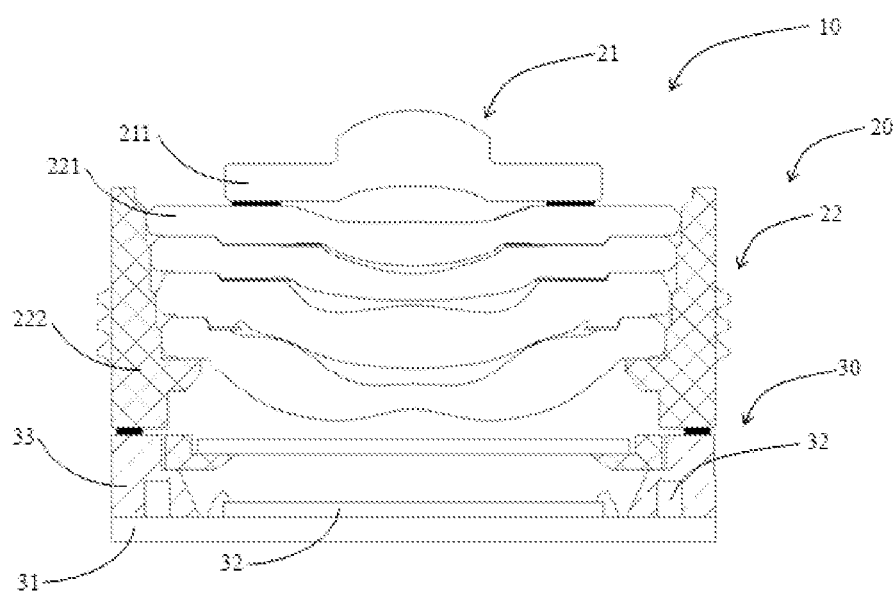
FIG. 4 shows a schematic diagram of a camera module according to an example of the present application.

As shown in FIG. 4, a camera module 10 based on an example of the present application is illustrated, wherein the camera module 10 is configured as a front camera module 10 of a terminal device to meet the need of a user such as selfies. In the example of the present application, the terminal device includes, but is not limited to, a smart phone, a tablet computer, a wearable device, and the like.

In the example of the present application, the camera module 10 includes an optical lens and a photosensitive assembly 30, wherein the optical lens is held on a photosensitive path of the photosensitive assembly 30 so that light collected by the optical lens may be imaged in the photosensitive assembly 30 along the photosensitive path. In particular, in the example of the present application, the optical lens is implemented as a split camera lens 20, which includes at least two lens portions. The photosensitive assembly 30 includes a circuit board 31, a photosensitive chip 32 electrically connected to the circuit board 31, at least one electronic component 32 arranged on the circuit board 31, and a package body 33 arranged on the circuit board 31 and other components; wherein the split camera lens 20 is mounted on the package body 33.

It should be noted that, the camera module 10 shown in FIG. 4 is a fixed-focus camera module. Those skilled in the art should know that, the camera module 10 according to this application may also be implemented as a dynamic-focus camera module, i.e., the camera module 10 further includes a driving element (not shown in the figure) arranged between the split camera lens 20 and the photosensitive assembly 30, so that the split camera lens 10 is carried by the driving element to move along the photosensitive path, thereby changing the distance between the split camera lens 10 and the photosensitive assembly 30.

Figure 5:
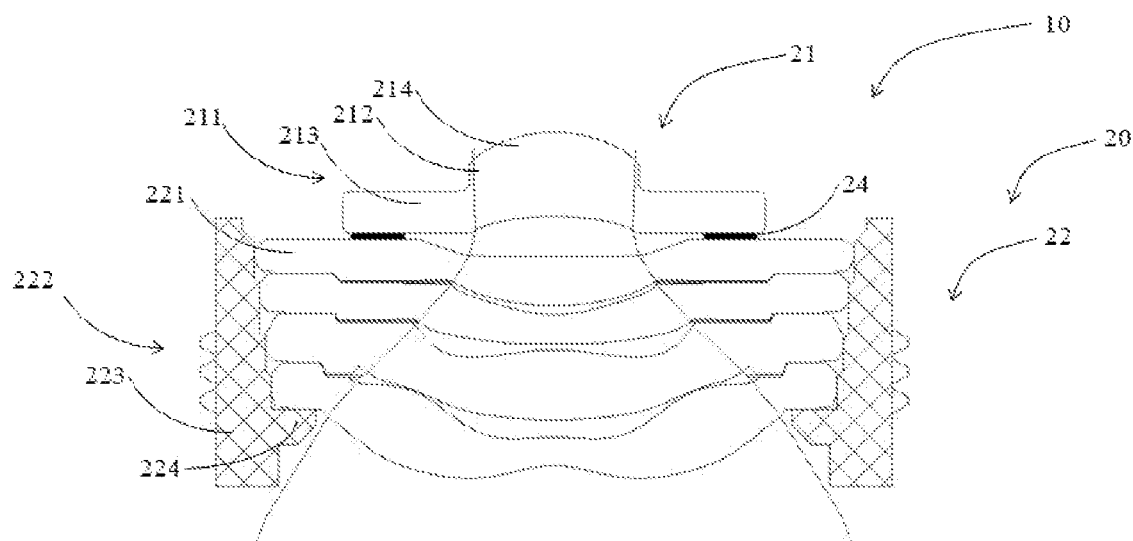
FIG. 5 shows a schematic diagram of a structure of a split camera lens of the camera module according to an example of the present application.

As shown in FIG. 5, in the example of the present application, the split camera lens 20 includes two lenses portions of a first lens portion 21 and a second lens portion 22, wherein the first lens portion 21 includes a first optical lens 211, and the second lens portion 22 includes a lens barrel 222 and at least one second optical lens 221 mounted in the lens barrel 222. In particular, in the example of the present application, an inner diameter of the lens barrel 222 is large at the top and small at the bottom, and the at least one optical lens 221 is mounted in the lens barrel 222 from top to bottom in an upside-down manner, and the second optical lens 221 at the topmost side is completely exposed on the top of the lens barrel 222. That is, in the example of the present application, there is no "lens barrel top face" structure between the first optical lens 211 and the second optical lens 221 immediately adjacent to it.

Particularly, as shown in FIG. 5, in the example of the present application, the lens barrel 222 includes a lens barrel main body 223 of which an inner diameter decreases from top to bottom, and a supporting platform 224 which protrudes and extends from a bottom area of the lens barrel main body 223, and the at least one second optical lens 221 is mounted in the lens barrel main body 223 from bottom to top in an upside-down manner, and the second optical lens 221 at the bottommost side is mounted on the supporting platform 224. Herein, in the example of the present application, the top of the second lens portion 22 represents a direction of the second lens portion 22 toward the object side, and the bottom of the second lens portion 22 represents a direction of the second lens portion 22 toward the image side. It should be observed that, the top of the lens barrel main body 223 has an opening (wherein the opening is fully open) to completely expose the second optical lens 221 at the topmost side. That is, in the example of the present application, the lens barrel main body 223 is not provided with an inwardly extending supporting structure on the top thereof, so that the second optical lens 221 at the topmost side can be completely exposed on the top of the lens barrel main body 223.

In a specific implementation, the inner diameter of the lens barrel main body 223 may be gradually reduced from top to bottom along an inner wall of the lens barrel main body 223 (i.e., a cross section of the lens barrel main body 223 has a trapezoidal shape), so that the at least one second optical lens 221 is mounted in the lens barrel main body 223 from bottom to top in an upside-down manner. Alternatively, in other examples of the present application, the inner diameter of the lens barrel main body 223 may be lowered in steps along the inner wall of the lens barrel main body 223 from top to bottom, so as to form a mounting platform 215 on each stepped surface for supporting each second optical lens 221, and it is not limited in this application.

Correspondingly, as shown in FIG. 5, in the example of the present application, the at least one second optical lens 221 is mounted in the lens barrel main body 223 from bottom to top in an upside-down manner. In particular, firstly the second optical lens 221 at bottomside side is mounted on the supporting platform 224; then, the other second optical lens 221 are mounted in the lens barrel main body 223 in sequence. It should be understood that, corresponding to the size change of the lens barrel main body 223, in the example of the present application, the diameter of the second optical lens 221 gradually increases from bottom to top (including a case that part of the second optical lens 221 has the same diameter). That is, in the example of the present application, the diameter of the second optical lens 221 located on the upper side is not less than the diameter of the second optical lens 221 located on the lower side. That is, in the example of the present application, among all of the second optical lenses 221, the second optical lens 221 at the topmost side has the largest diameter size, and in this way, a larger mounting area is provided for mounting the second lens portion 22.

It is worth mentioning that, in other examples of the present application, among all of the second optical lenses 221, the one with the largest diameter size may not be set as the second optical lens 221 at the topmost side, but may be set as another second optical lens 221. For example, the second optical lens 221 with the largest diameter size is set as the second optical lens 221 located at a lower side of the second optical lens 221 at the topmost side, and it is not limited in this application.

It is worth mentioning that, the supporting platform 224 is provided at the bottom of the lens barrel 222, and since the bottom of the lens barrel 222 has a relatively large space, there is sufficient space to configure the thickness of the supporting platform 224. In this way, not only may it be ensured that the split camera lens 20 meets the requirement of structural strength, but the overall size of the split camera lens 20 does not need to be increased. It should be understood that, the "sufficient space" comes from a considerable height difference between the optical zone and the structural zone of the second optical lens 221 at the bottommost side. Correspondingly, in the example of the present application, the supporting platform 224 may extend integrally from the inner wall of the lens barrel main body 223, i.e., the supporting platform 224 and the lens barrel main body 223 may have an integral structure. Of course, in other examples of the present application, the supporting platform 224 and the lens barrel main body 223 may have separated structures, wherein the supporting platform 224 is a separate component and is fixed on the inner wall of the lens barrel main body 223. In this regard, it is not limited in this application.

Figure 13:
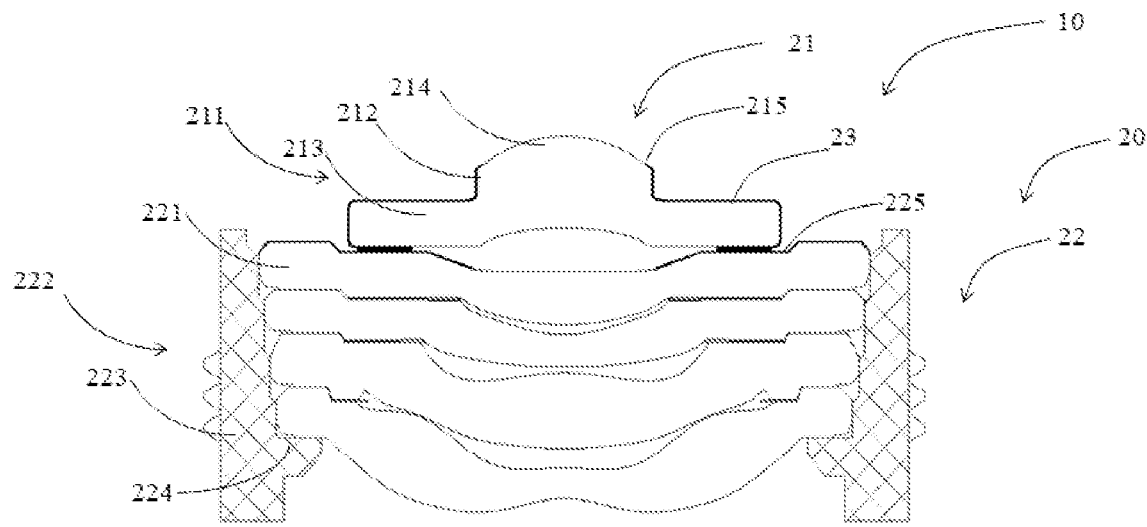
FIG. 13 shows a schematic diagram of still another variant implementation of the split camera lens according to an example of the present application.

It is worth mentioning that, in order to protect and encapsulate the second optical lens 221, preferably the lower end surface of the lens barrel main body 223 is lower than the lower end surface of the second optical lens 221 at the bottommost side. More preferably, in the example of the present application, the upper end surface of the lens barrel main body 223 is higher than the upper end surface of the second optical lens 221 at the topmost side. In order to further enhance the structural strength and reliability of the split camera lens 20, in some examples of the present application, at least some of the second optical lens 221 may be fitted with each other, i.e., in some examples of the present application, some of the second optical lens 221 are fitted with each other to form a chimera lens, as shown in FIG. 13.

Further, as shown in FIG. 5, in the example of the present application, the split camera lens 20 has a configuration of a "small head" structure. Particularly, in the example of the present application, the first optical lens 211 included in the first lens portion 21 includes an optical zone 212 and a structural zone 213 surrounding the optical zone 212. The optical zone 212 includes a convex portion 214 protruding and extending from the structural zone 213 to form a configuration of the "small head" structure. Herein, the optical zone 212 represents a part of the first optical lens 211 that participates in light-transmitting imaging, and the structural zone 213 represents a part of the first optical lens 211 that does not participate in the light-transmitting imaging.

Particularly, in the example of the present application, an upper end surface of the first optical lens 211 is higher than an upper end surface of the lens barrel main body 223. Preferably a height of the upper end surface of the first optical lens 211 exceeding the upper end surface of the lens barrel main body 223 accounts for ½-¾ of its own height. It should be noted that, with the configuration of the "small head" structure of the first lens portion 21, the optical zone 212 of the first optical lens 211 may be relatively more protruding than the structural zone 213 thereof, and as a result, when the split camera lens 20 is assembled in the terminal device in such a way that the first optical lens 211 is fitted into the through hole of the display screen of the terminal device, the optical zone 212 of the first optical lens 211 can be closer to the top of through hole to obtain a larger field angle and light flux, thereby ensuring that the camera module 10 has a higher imaging quality.

Particularly, in the example of the present application, an upper side of the optical zone 212 of the first optical lens 211 is convex, and a lower side thereof is concave; alternatively, the lower side of the optical zone 212 is implemented to be convex or flat, and in this regard it is not limited in this application. As shown in FIG. 5, a lateral size of the first optical lens 211 is smaller than a lateral size of the second optical lens 221 at the topmost side. Of course, in other examples of the present application, the lateral size of the first optical lens 211 may be equal to or slightly larger than the lateral size of the second optical lens 221 at the topmost side. In this regard it is not limited in this application. In particular, in the example of the present application, a ratio of a clear aperture of the first optical lens 211 to a clear aperture of the second optical lens 221 at the topmost side is 0.8-1.25, as shown in FIG. 5. Herein, the clear aperture of the first optical lens 211 is formed on the upper side of the optical zone 212 of the first optical lens 211, and the clear aperture of the second optical lens 221 is formed on the upper side of the optical zone 212 of the second optical lens 221.

In order to facilitate fitting the first optical lens 211 into the through hole of the display screen of the terminal device, in the example of the present application, preferably the shape of the convex portion 214 is adapted to the shape of the through hole formed in the display screen. In particular, in the example of the present application, an angle between a sidewall of the convex portion 214 and an optical axis configured by the split camera lens 20 is less than 15°. Preferably, in the example of the present application, the sidewall is substantially parallel to the optical axis. More preferably, in the example of the present application, while the sidewall of the convex portion 214 is substantially parallel to the optical axis, it is also substantially perpendicular to the upper surface of the structural zone 213, so that an "L"-shaped structure is formed by the convex portion 214 and a transition area of the structural zone 213. It is worth mentioning that, in specific implementations, due to the limitation of processing technology, the sidewall of the convex portion 214 cannot be completely parallel to the optical axis and completely perpendicular to the upper surface of the structure region 213. The description of "substantially perpendicular to" and "substantially parallel to" is used to describe the standard of structural design and processing. Preferably, the upper surface of the convex portion 214 is implemented as a convex surface.

As mentioned above, in a conventional split camera lens 20, since there is the "lens barrel top face" structure between the first optical lens 211 and the second optical lens 221, the surface of the mounting base of the first optical lens 211 is too high, thereby affecting the height design of the upward extending of first optical lens 211. In contrast, in the example of the present application, the "lens barrel top face" structure is removed, and as a result, when the height is designed, the height difference between the optical zone 212 of the first optical lens 211 and the structural zone 213 may be further increased, so that when the optical lens is assembled in the through hole of the display screen of the terminal device, the optical zone 212 of the first optical lens 211 can be closer to the top of the through hole to obtain a larger field angle and light flux, thereby ensuring that the camera module 10 has a higher imaging quality.

In particular, in the example of the present application, the highest point of the convex portion 214 protrudes from the lower surface of the structure region 213 by at least 0.3-1.2 mm. That is, in the example of the present application, a distance between the highest point of the convex portion 214 and the highest point of the structural zone 213 is at least 0.3-1.2 mm; preferably, the distance between the highest point of the convex portion 214 and the highest point of the structural zone 213 is 0.4-0.8 mm. Meanwhile, in the example of the present application, the total height of the first optical lens 211 is 0.4-1.6 mm; preferably, the total height of the first optical lens 211 is 1.2-1.6 mm. Moreover, in the example of the present application, an outer diameter of the first optical lens 211 is in a range of 3.0-4.0 mm, preferably the outer diameter of the first optical lens 211 is in the range of 3.2-3.8 mm.

Figure 14:
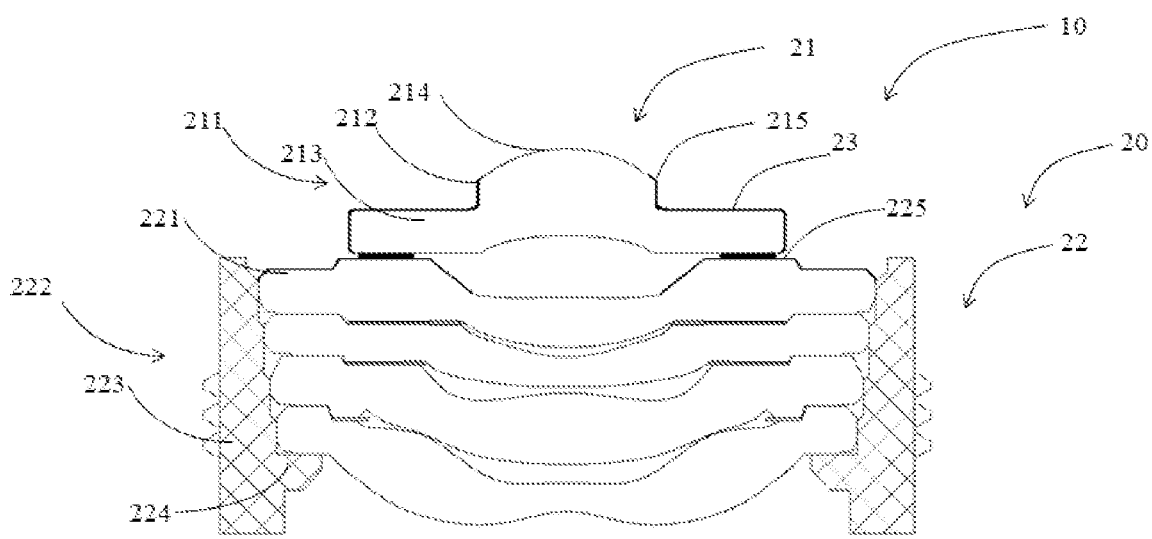
FIG. 14 shows a schematic diagram of still another variant implementation of the split camera lens according to an example of the present application.

In order to further increase the height difference between the convex portion 214 of the optical zone 212 of the first optical lens 211 and the structural zone 213, in some examples of the present application, the second optical lens 221 at the topmost side includes a mounting platform 215 concavely formed on the upper end surface of the second optical lens 221, and the mounting platform 215 is configured to mount the first optical lens 211 thereon, as shown in FIG. 13. Of course, those skilled in the art should understand that, in other examples of this application, the second optical lens 221 at the topmost side may also include a mounting platform 215 protruding and formed on the upper end surface of the second optical lens 221, and the mounting platform 215 is configured to mount the first optical lens 211 thereon, as shown in FIG. 14.

In a specific implementation, the first optical lens 211 may be implemented as a plastic lens, which may be molded by plastic injection, and then cut and polished into a desired shape. Of course, in other examples of the present application, the first optical lens 211 may also be implemented as a glass lens, which may be prepared by a glass molding process, and then cut or polished into a desired shape.

As mentioned above, in the example of the present application, the distance from the protruding highest point of the convex portion 214 of the first optical lens 211 to the point surface of the structural zone 213 is at least 0.3-1.2 mm, and the total height of the first optical lens 211 is 0.4-1.6 mm. In other words, the thickness size of the first optical lens 211 is relatively high, resulting in a relatively low light transmittance of the first optical lens 211. Therefore, the use of a glass material with a higher light transmittance may reduce the influence of the greater thickness of the first optical lens 211 on the light transmittance.

Particularly, a molding principle of molded glass is: placing a preformed glass in a precision processing mold, raising the temperature to soften the glass, and then pressing the mold surface to deform the glass and taking it out of the mold, thereby obtaining a lens with desired shape. Since the first optical lens 211 is an aspheric lens, and the molded glass needs to be processed by pressing the glass with a mold, the production of biconcave lens from the molded glass will cause greater damage to the mold. Therefore, preferably the upper surface of the first optical lens 211 is convex. At the same time, since the molded glass is manufactured by a mold, after the molding of the molded glass, there may be a relatively large inclination angle between the sidewall of the convex portion 214 of the first optical lens 211 and the optical axis; then the first optical lens 211 may be grinded by cold processing technology, so that the angle between the sidewall of the convex portion 214 of the first optical lens 211 and the optical axis is less than 15°.

It is worth mentioning that, in case that the first optical lens 211 is implemented as a glass lens, the refractive index of the light-transmitting glass is preferably 1.48-1.55, and its Abbe number of refractive index is preferably 50-71. In this way, the split camera lens 20 has a higher imaging quality (for example, aberrations such as chromatic dispersion are well controlled within a certain range). At the same time, the use of glass materials may have a better temperature drift.

Figure 6:
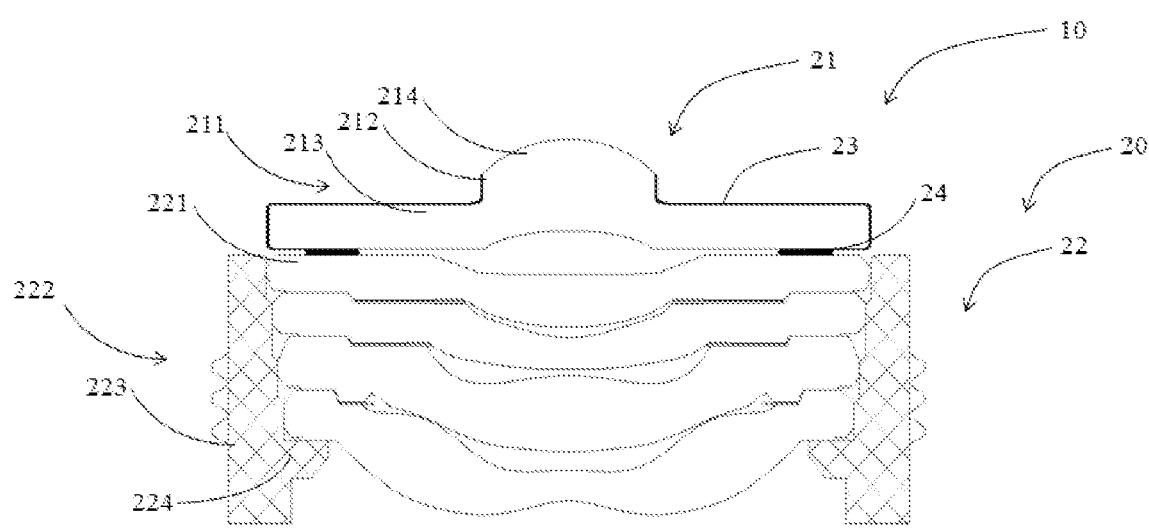
FIG. 6 shows a schematic diagram of a variant implementation of the split camera lens according to an example of the present application.

FIG. 6 shows a schematic diagram of a variant implementation of the split camera lens according to an example of the present application. As shown in FIG. 6, in this variant implementation, the first optical lens 211 further includes a light-shielding layer 23 provided in a non-optical effective zone of the first optical lens 211. Herein, the non-optical effective zone of the first optical lens 211 includes the structural zone 213 of the first optical lens 211 and a part of the optical zone 212 that does not play a role in imaging and lighting. In a specific implementation, the light-shielding layer 23 may be formed by an ink layer, and the thickness of the ink layer is preferably greater than 5 μm, preferably the thickness of the ink layer is set as 15-30 μm to achieve higher light-shielding ability. It should be understood that, the light-shielding layer 23 also functions as a diaphragm. For example, when the light-shielding layer 23 is formed in the non-optical effective zone of the first optical lens 211, the light-shielding layer 23 may control the amount of light entering the split optical lens.

Figure 7:
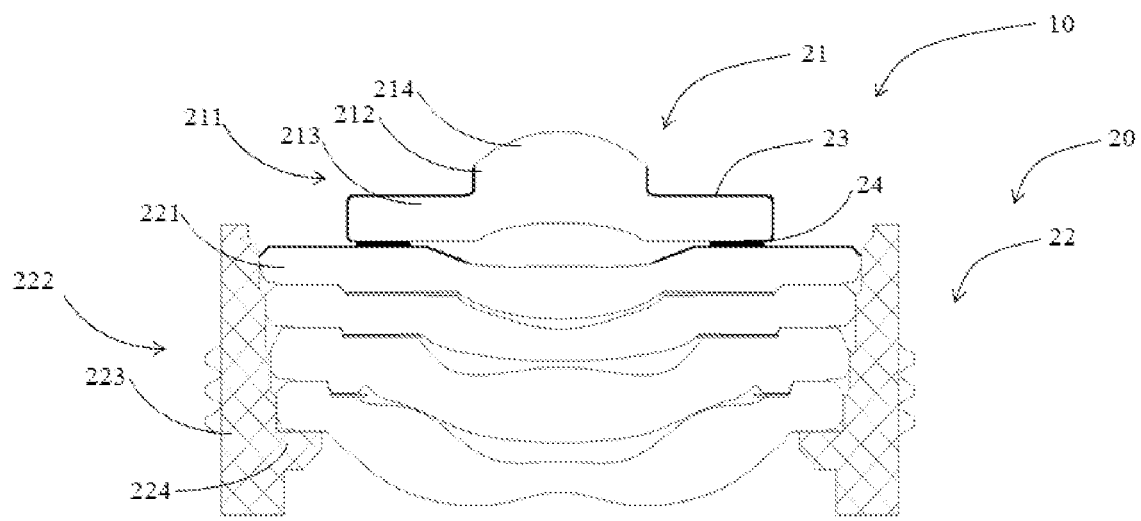
FIG. 7 shows a schematic diagram of another variant implementation of the split camera lens according to an example of the present application.

Particularly, when the lateral size of the first optical lens 211 corresponds to that of the second optical lens 221 at the topmost side, the light shielding layer 23 covers the upper surface and the side surface of the structural zone 213 of the first optical lens 211, and the sidewall of the convex portion 214, as shown in FIG. 6. When the lateral size of the first optical lens 211 is smaller than that of the second optical lens 221 at the topmost side, the light shielding layer 23 covers the upper surface and the side surface of the structural zone 213 of the first optical lens 211, the sidewall of the convex portion 214, and at least part of the upper surface of the second optical lens 221 at the topmost side, as shown in FIG. 7.

Figure 8:
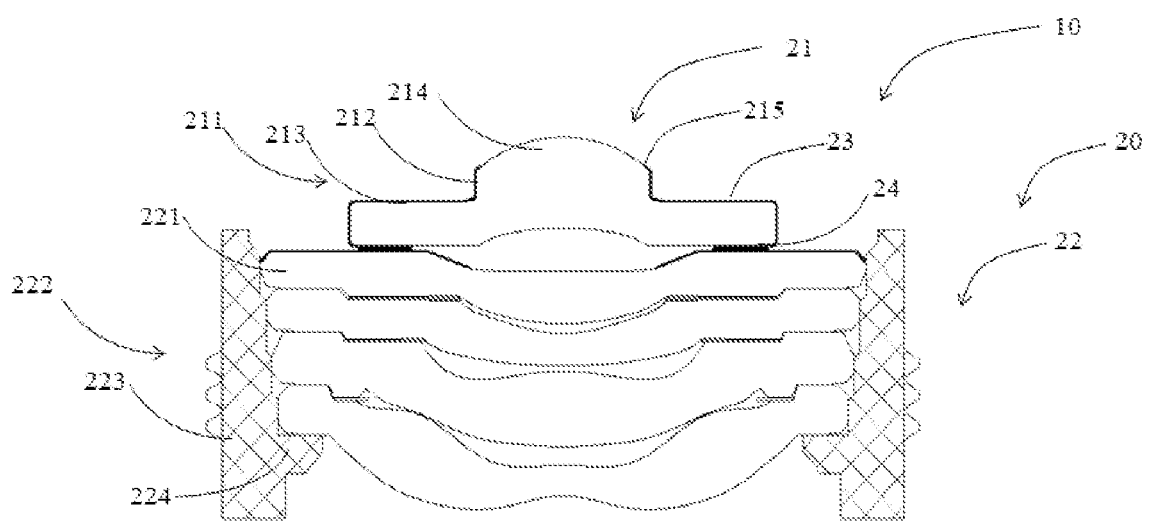
FIG. 8 shows a schematic diagram of still another variant implementation of the split camera lens according to an example of the present application.

Furthermore, when the first optical lens 211 is a glass lens formed by a glass molding process, the molding accuracy at the edge of the first optical lens 211 is relatively difficult to control; accordingly a transition area will be formed between the upper surface and the sidewall of the convex portion 214, and the transition area does not play a role in imaging and lighting. In some examples of the present application, the light shielding layer 23 further covers the transition area 215 between the sidewall of the convex portion 214 and the upper surface thereof, as shown in FIG. 8. In particular, the length of the transition area 215 in the direction from the sidewall of the convex portion 214 to the center of the convex portion 214 is 0.03-0.05 mm. Of course, in other examples of this application, the distance may also be set as other values, depending on the molding accuracy of the glass molding process. Meanwhile, those skilled in the art should understand that, when a lens of other material is made by other molding processes, there may be accuracy problem at the edge or transition due to molding accuracy problem, and the transition area 215 is generated.

It is worth mentioning that, in other examples of the present application, the light shielding layer 23 may also cover other areas of the first optical lens 211, for example, at least part of the non-optical zone of the lower surface of the first optical lens 211. Even in other examples of the present application, the light shielding layer 23 may also cover at least part of the non-optical zone of the second optical lens at the topmost side. In this regard, it is not limited in this application.

It is worth mentioning that, in other examples of this application, the light shielding layer 23 may also be made of other materials. For example, the light shielding layer 23 may be formed by attaching a SOMA sheet to the non-optical zone 212 of the first optical lens 211. In this regard, it is not limited in this application.

Further, in the example of the present application, the first lens portion 21 is assembled on the first lens portion 21 by means of active optical alignment (AOA).

Particularly, in the split camera lens 20 as shown in FIG. 5, the first lens portion 21 is a "naked lens", which only includes the first optical lens 211. Correspondingly, in a specific implementation, the first optical lens 211 is attached to the upper surface of the second optical lens 221 at the topmost side by the adhesive 24. That is, in the example of the present application, a bonding position of the first lens portion 21 and the second lens portion 22 is set at a position between the first optical lens 211 and the second optical lens side 221 at the topmost side. Of course, in other examples of this application, the bonding position may also be set at other positions, for example, a position between the first optical lens 211 and the lens barrel 222; or a position between the first optical lens 211, the second optical lens 221 at the topmost side and the lens barrel 222, and in this regard it is not limited in this application. In addition, preferably the adhesive 24 includes a glue of opaque material to increase the effect of preventing stray light (the stray light may come from external light, or refraction or reflection of the light of the display screen itself).

Figure 9:
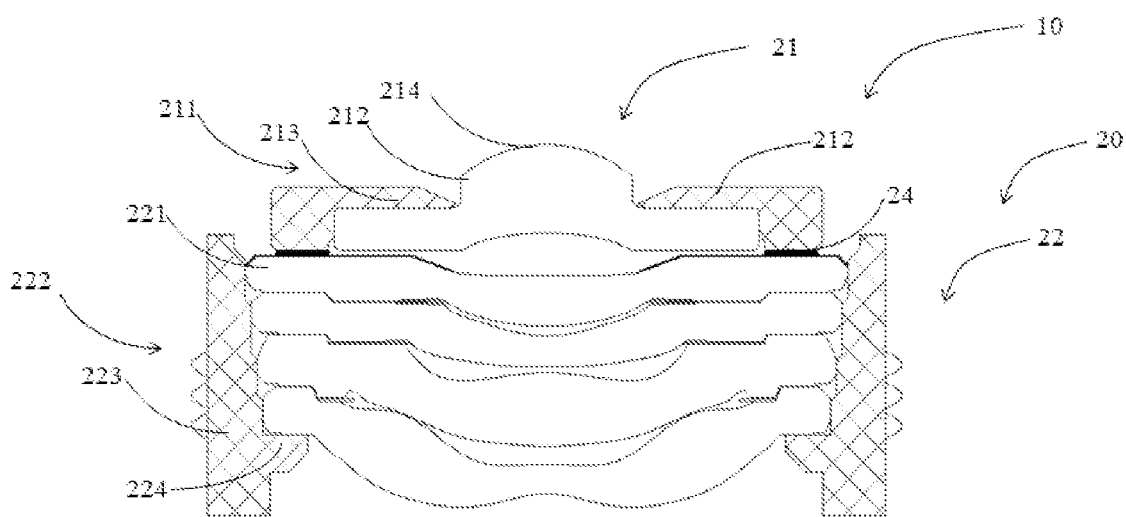
FIG. 9 shows a schematic diagram of still another variant implementation of the split camera lens according to an example of the present application.

FIG. 9 shows a schematic diagram of a variant implementation of the split camera lens 20 according to an example of the present application. As shown in FIG. 9, in this variant implementation, the first lens portion 21 further includes a first lens barrel 212 for accommodating the first optical lens 211, i.e., in this variant implementation, the first lens portion 21 is not a "naked lens". Correspondingly, the first lens portion 21 may be attached to the second lens portion 22 through the adhesive 24 by means of active optical alignment, and the bonding position may be set at a position between the first lens barrel 212 and the lens barrel 222, or a position between the first optical lens 211 and the second optical lens 221 at the topmost side, or a position between the first optical lens 211, the second optical lens 221 at the topmost side, the first lens barrel 212 and the lens barrel 222. In this regard, it is not limited in this application.

It is worth mentioning that, when the first lens portion 21 includes the first lens barrel 212, the effect of the light shielding layer 23 may be achieved by the first lens barrel 212. In other words, the light shielding layer 23 is formed on the first lens barrel 212.

Figure 10:
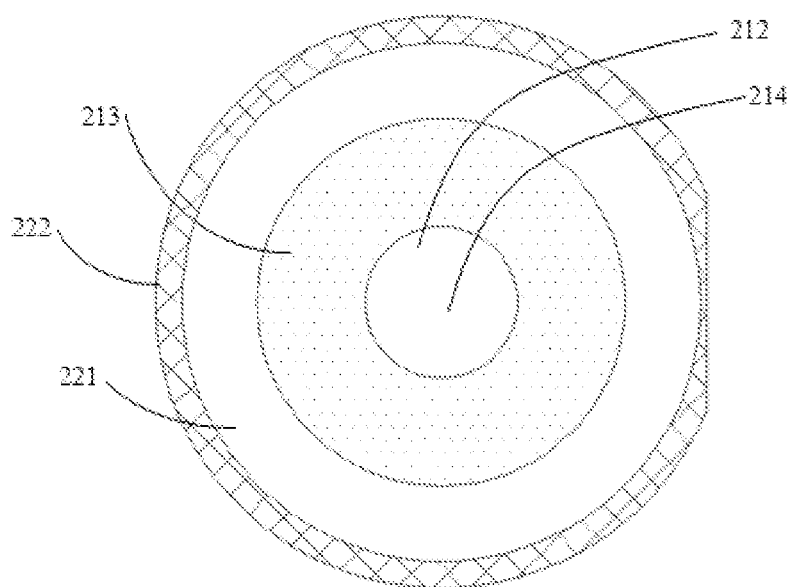
FIG. 10 shows a schematic diagram of still another variant implementation of the split camera lens according to an example of the present application.
Figure 11:
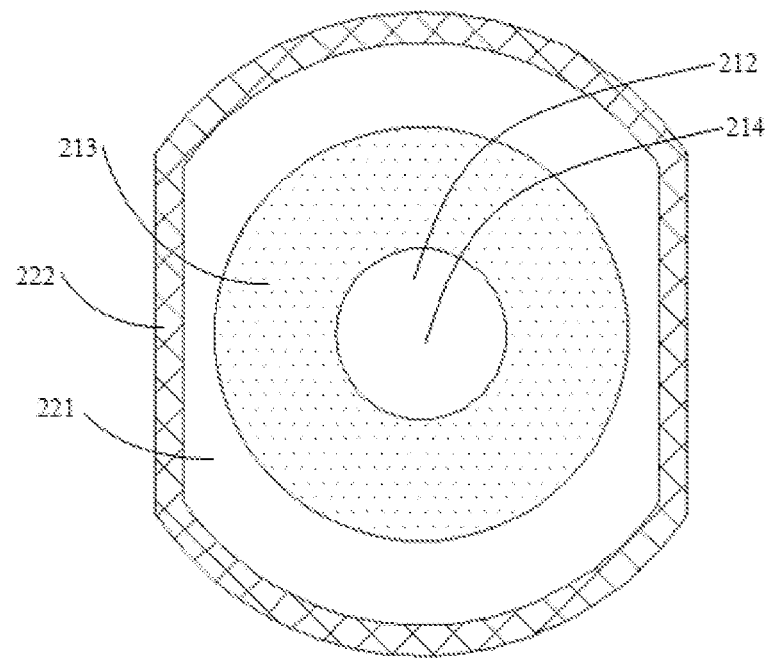
FIG. 11 shows a schematic diagram of still another variant implementation of the split camera lens according to an example of the present application.

FIG. 10 shows another variant implementation of the split camera lens according to an example of the present application. As shown in FIG. 10, in this variant implementation, a cross-sectional shape of the split camera lens 20 is a "D" shape. FIG. 11 shows another variant implementation of the split camera lens according to an example of the present application. As shown in FIG. 11, in this variant implementation, a cross-sectional shape of the split lens barrel 222 is "O". In a specific implementation, the split camera lens 20 as shown in FIG. 10 and FIG. 11 may be achieved by cutting at least part of the lens barrel 222 and even at least part of the structural zone 213 of the second optical lens 221; alternatively, in the molding process, the second optical lens 221 with a "D" shape or "○" shape is directly molded.

It should be understood that, when the split camera lens 20 is implemented as the split camera lens 20 as shown in FIG. 10 and FIG. 11, the front camera module 10 assembled in the terminal device can be closer to the edge of the terminal device, i.e., the through hole of the display screen is made closer to the edge to improve the aesthetics.

It is worth mentioning that, in other examples of the present application, the cross-sectional shape of the split camera lens 20 may also be implemented in other shapes, such as "○", etc.; in this regard it is not limited by this application.

Figure 12:
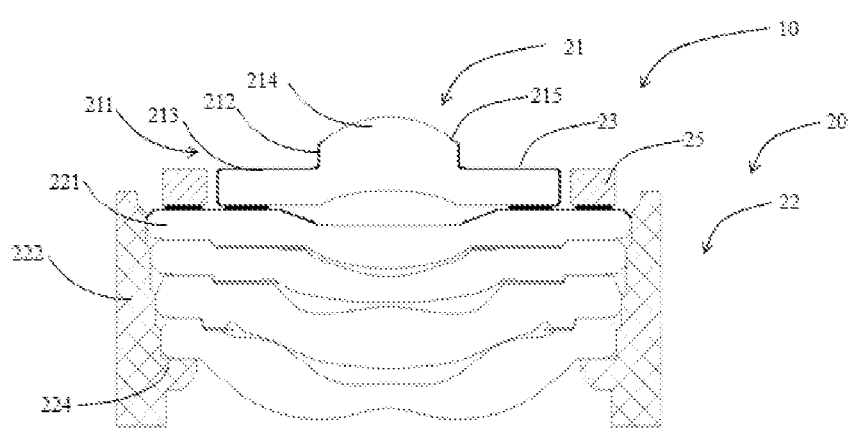
FIG. 12 shows a schematic diagram of still another variant implementation of the split camera lens according to an example of the present application.

FIG. 12 shows another variant implementation of the split camera lens according to an example of the present application. As shown in FIG. 12, in this variant example, the split camera lens 20 further includes a protective element 25 arranged on the second optical lens 221 at the topmost side. Particularly, the protection element 25 is formed on the upper end surface of the second optical lens 221 to protect the second optical lens 221. It should be understood that, in applications such as testing, transportation, and use of the split camera lens 20, it is easy to be collided, thereby causing the performance or reliability to be impaired, especially when the second optical lens 221 at the topmost side and the upper end surface of the lens barrel 222 is flush. Correspondingly, the protection element 25 may effectively prevent the second optical lens 221 from being collided and causing the performance or reliability to be impaired. In a specific implementation, the protection element 25 may be adhered to the second optical lens 221 at the topmost side and/or the lens barrel 222 through the adhesive 24 after the split camera lens 20 is assembled.

It is worth mentioning that, in other examples of the present application, the optical system of the split camera lens 20 may also be configured in other ways. For example, the first lens portion 21 may include more optical lens, and the second lens portion 22 may include fewer optical lens. For example, the first lens portion 21 may include the first optical lens 211 and at least part of the second optical lens 221, and the second lens portion 22 includes other second optical lens 221, and the second optical lens 221 at the topmost side is also exposed on the top of the second lens portion 22.

Moreover, in other examples of the present application, the split camera lens 20 further includes more lens portions. For example, the split camera lens 20 may include three lens portions: a first lens portion 21, a second lens portion 22, and a third lens portion (not shown in the figure); additionally, the first lens portion 21, the second lens portion 22 and the third lens portion are assembled in an AOA manner to ensure the assembly accuracy and yield.

In summary, the camera module 10 and its split camera lens 20 based on the example according to the present application are illustrated, which removes the "lens barrel top face" structure of the first lens portion 21 and the second lens portion 22, so that on one hand, the adjustment range of the split camera lens 20 becomes larger; on the other hand, the influence of the "lens barrel top face" structure on the optical design (especially the height design) of the first optical lens 211 is eliminated; and as a result, the optical zone 212 of an optical lens 211 may be relatively more protruding than its structural zone 213, so that when the split camera lens 20 is assembled in the terminal device in such a manner that the first optical lens 211 is fitted into the through hole of the display screen of the terminal device, the optical zone 212 of the first optical lens 211 can be closer to the top of the through hole to obtain a larger field angle and light flux, thereby ensuring the camera module 10 has a high imaging quality.

Schematic Terminal Device

Figure 15:
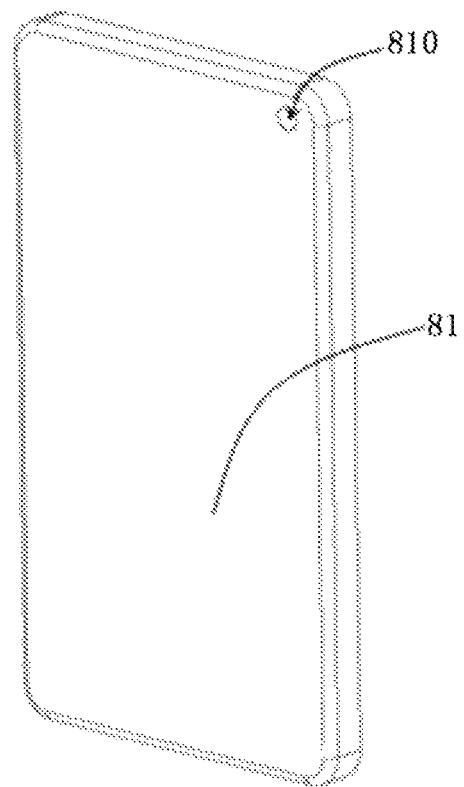
FIG. 15 shows a terminal device according to an example of the present application.

According to another aspect of the present application, a terminal device is also provided. FIG. 15 shows a terminal device according to an example of the present application. As shown in FIG. 15, the terminal device 100 includes a terminal main body 80 including a display screen 81, and the camera module 10 as described above, wherein the camera module 10 and the display screen 81 are mounted on a same side to be configured as a front camera module 10, thereby realizing the user's selfie and other functional requirements. The display screen 81 may be implemented as an LCD or OLED display screen 81.

Figure 16:
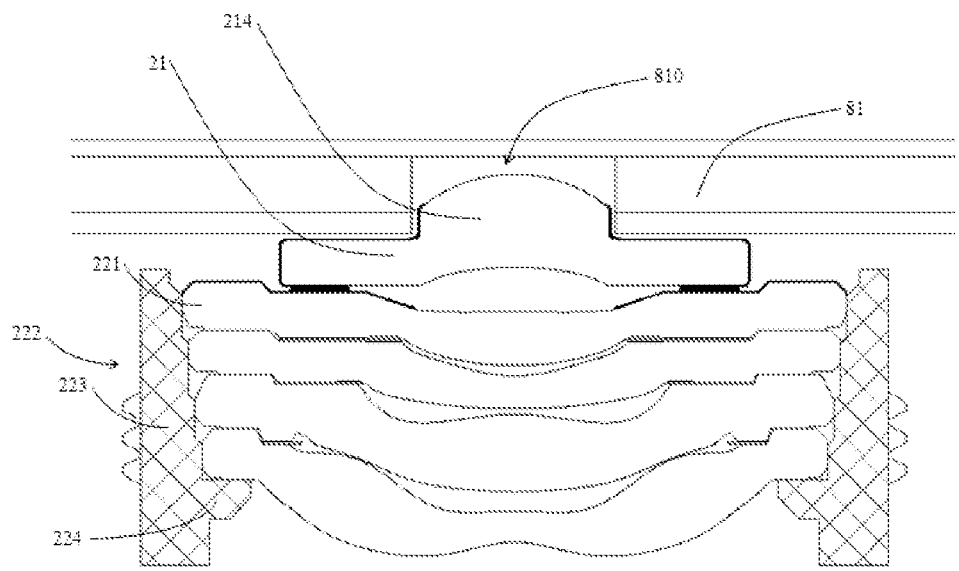
FIG. 16 shows a schematic diagram of the split camera lens assembled in the terminal device according to an example of the present application.

FIG. 16 shows a schematic diagram of the split camera lens assembled in the terminal device according to an example of the present application. As shown in FIG. 16, the display screen 81 has a through hole 810 formed through it, wherein an inner diameter of the through hole 810 is slightly larger than the lateral size of the convex portion 214. Herein, the through hole 810 of the display screen 81 is formed in an opaque material in the display screen 81, wherein the top of the through hole 810 is a cover layer (usually a glass cover plate) of the display screen 81. When the camera module 10 is assembled on a front side of the terminal device 100, the convex portion 214 of the first optical lens 211 of the split camera lens 20 is fitted into the through hole 810. That is, in the example of the present application, the split camera lens 20 is assembled in the terminal device in such a way that the first optical lens 211 is fitted into the through hole 810 of the display screen 81; and in this way, the optical zone 212 of the first optical lens 211 can be closer to the top of the through hole 810 to obtain a larger field angle and light flux, thereby ensuring that the camera module 10 has a higher imaging quality.

In particular, in the example of the present application, the first optical lens 211 is fitted into the through hole 810 of the display screen 81, and the first optical lens 211 can be fitted into the through hole 810 of the display screen 81 with a gap, or the first optical lens 211 can be fitted into the through hole 810 of the display screen 81 in a gap-free manner. Preferably, the first optical lens 211 is fitted into the through hole 810 of the display screen 81 with a gap, so that the assembly tolerance between the split camera lens 20 and the display screen 81 may be tolerated and adjusted, and the movement of the display screen 81 has a relatively small impact on the split camera lens 20.

In particular, in the example of the present application, the highest point of the convex portion 214 protrudes from the lower surface of the structural zone 213 by at least 0.3-1.2 mm. When the split camera lens 20 is assembled in the terminal device in such a way that the first optical lens 211 is fitted into the through hole 810 of the display screen 81, a distance between the upper surface of the convex portion 214 and a top end of the through hole 810 is in a range of 0.01-0.5 mm, so that the split camera lens 20 has a relatively large field angle (for example, it may not be less than 60°) and light flux. Herein, the top end of the through hole 810 represents a lower surface of the cover layer of the display screen 81. Moreover, in the example of the present application, the diameter of the convex portion 214 is not greater than 1-2.5 mm. Therefore, the diameter of the through hole 810 of the display screen 81 may be reduced, so that the "screen-to-body ratio" of the terminal device 100 may be improved.

It is worth mentioning that, the light-shielding layer 23 provided on the surface of the split camera lens 20 may avoid stray light caused by external light or refraction or reflection of the internal light of the display screen 81.

Figure 17:
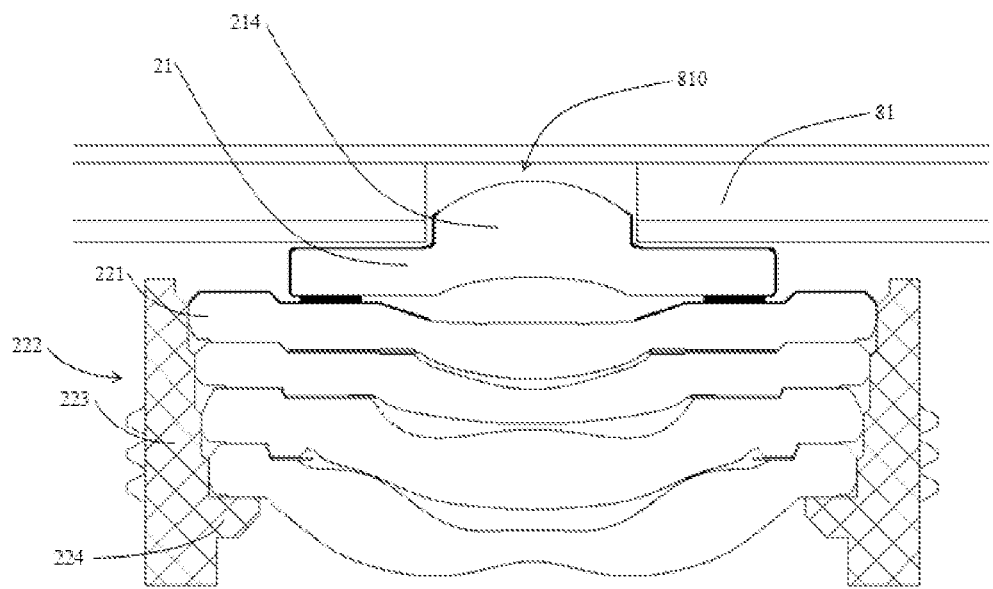
FIG. 17 shows a schematic diagram of another implementation manner in which the split camera lens is assembled in the terminal device according to an example of the present application.

FIG. 17 shows a schematic diagram of another implementation in which the split camera lens is assembled in the terminal device according to an example of the present application. As shown in FIG. 17, in this variant implementation, the through hole 810 is implemented as a stepped hole, and the split camera lens 20 is assembled in the terminal device in such a way that the convex portion 214 of the first optical lens 211 and part of the structural zone 213 is fitted into the through hole 810; and in this way, the optical zone 212 of the first optical lens 211 can be closer to the top of the through hole 810 to obtain a larger field angle and light flux, thereby ensuring that the camera module 10 has a higher imaging quality. It is worth mentioning that in this way, the overall height of the camera module 10 and the terminal device 100 may be further reduced, thereby facilitating to obtain a thinner and lighter terminal device.

Schematic Method for Assembling Split Camera Lens 20

Figure 18:
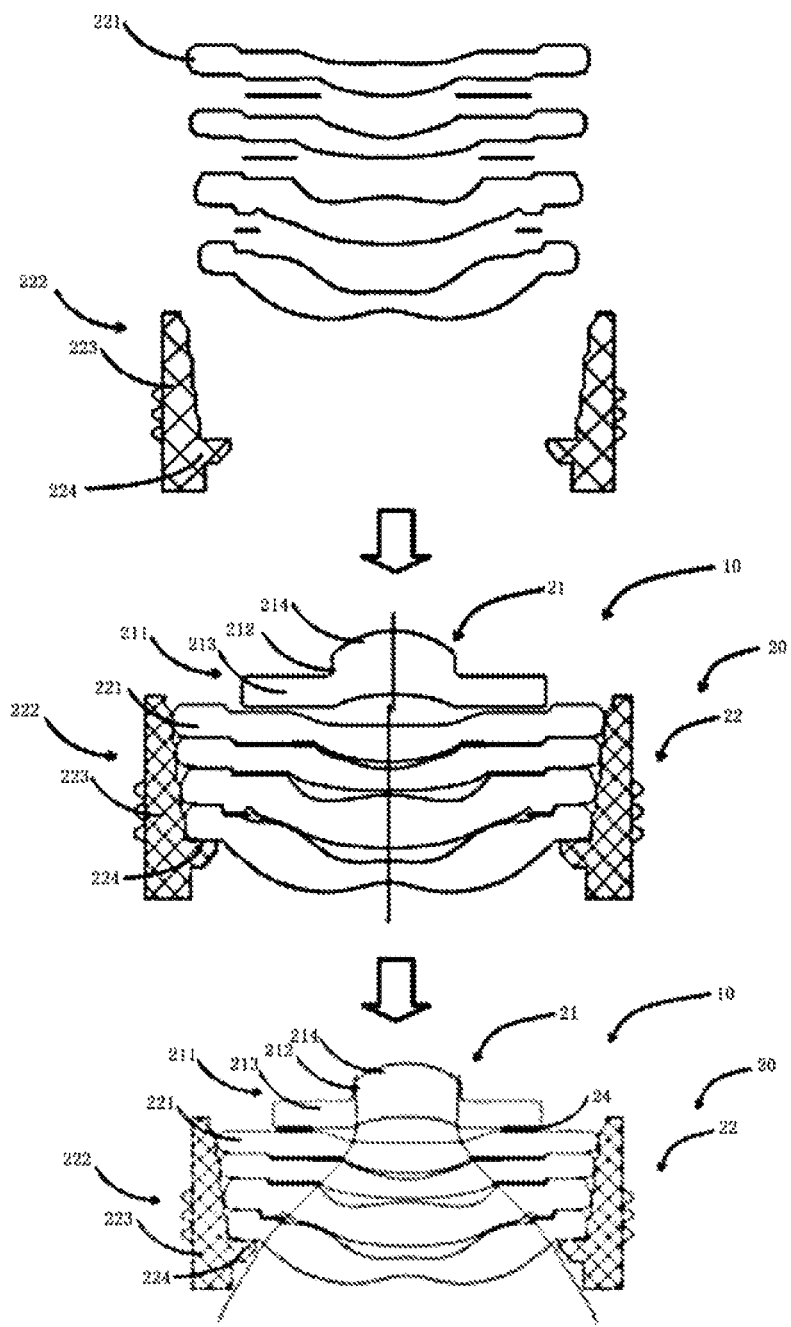
FIG. 18 shows a schematic diagram of an assembly process of the split camera lens according to an example of the present application.

FIG. 18 shows a schematic diagram of an assembly process of the split camera lens 20 according to an example of the present application. As shown in FIG. 18, the assembly process of the split camera lens 20 according to the present application firstly includes: providing the lens barrel 222, at least one second optical lens 221, and the first lens portion 21 including the first optical lens 211; wherein the lens barrel 222 includes the lens barrel main body 223 of which the inner diameter decreases from top to bottom, and the supporting platform 224 which protrudes and extends from the bottom area of the lens barrel main body 223.

Then, the at least one second optical lens 221 is mounted in the lens barrel main body 223 from bottom to top in an upside-down manner, so as to form the second lens portion 22; wherein the second optical lens 221 at the topmost side is completely exposed on the top of the lens barrel 222.

Then, the first lens portion 21, the second lens portion 22, and the photosensitive assembly 30 are pre-positioned along the direction of the optical axis.

Furthermore, the relative positional relationship between the first lens portion 21 and the second lens portion 22 is adjusted by means of the active optical alignment.

Finally, the first lens portion 21 is fixed to the first lens portion 21 to form the split camera lens 20.

In the example of the present application, adjusting the relative position relationship between the first lens portion 21 and the second lens portion 22 by means of active optical alignment includes:

adjusting the relative positional relationship between the first lens portion 21 and the second lens portion 22 based on the imaging quality of the image acquired by the imaging system consisting of the first optical lens 211, the second lens portion 22 and the photosensitive assembly 30.

Particularly, firstly an image of an object to be tested is acquired through the photosensitive assembly 30 in cooperation with the split optical lenses, and then a molding quality and an adjustment amount of the split camera lens 20 are calculated through calculation methods for imaging quality such as SFR and MTF. Then, the relative positional relationship between the first lens portion 21 and the second lens portion 22 is adjusted in real time in at least one direction (at least one direction refers to the xyz direction and the direction of rotation around the xyz axis respectively) according to the adjustment amount, so as to make the imaging quality of the split camera lens 20 (mainly including optical parameters such as peak, field curvature, astigmatism, etc.) reach a preset threshold after one or more adjustments.

In the example of the present application, the process of fixing the first lens portion 21 to the second lens portion 22 to form the split camera lens 20 includes: firstly applying the adhesive 24 between the first optical lens 211 and the second optical lens 221 at the topmost side; and curing the adhesive 24 to fixedly attach the first optical lens 211 to the second optical lens 221 at the topmost side, thereby fixing the first lens portion 21 to the second lens portion 22. In particular, in the example of the present application, the adhesive 24 may be cured by thermal curing or light curing, i.e., the adhesive 24 contains a photo-curable ingredient or a thermal-curable ingredient.

It is worth mentioning that, in the example of the present application, the step of applying the adhesive 24 may also be performed after the active optical alignment, i.e., after the imaging quality correction of the split camera lens 20 is completed, the first lens portion 21 is removed, and then an adhesive 24 is applied to the corresponding position of the second lens portion 22. In this regard, it is not limited in this application.

In summary, the method for assembling the split camera lens 20 according to the example of the present application is illustrated, and it may be used for manufacture of the split camera lens 20 as described above and the variant implementation thereof.

Those skilled in the art should understand that, the above description and the examples of the present invention illustrated in the accompanying drawings are only examples and do not limit the present invention. The object of the present invention has been completely and effectively achieved. The function and structural principle of the present invention have been demonstrated and explained in the examples. Without departing from the principle, the implementation of the present invention may have any variant or modification.

The invention claimed is:

1. A split camera lens, characterized by comprising:
   a first lens portion including a first optical lens; and
   a second lens portion including a lens barrel and at least one second optical lens mounted in the lens barrel, wherein an inner diameter of the lens barrel is large at the top and small at the bottom, and the second optical lens at the topmost side is completely exposed on the top of the lens barrel;
   wherein there is an adjustment gap between the first lens portion and the second lens portion, and the first lens portion is attached to the second optical lens at the topmost side through an adhesive, and
   a ratio of a clear aperture of the first optical lens to a clear aperture of the second optical lens at the topmost side is 0.8-1.25.

2. The split camera lens according to claim 1, wherein the first optical lens is attached to the second optical lens at the topmost side by the adhesive.

3. The split camera lens according to claim 1, wherein the lens barrel includes a lens barrel main body of which an inner diameter decreases from top to bottom, and a supporting platform which protrudes and extends from a bottom area of the lens barrel main body, and the at least one second optical lens is mounted in the lens barrel main body from bottom to top in an upside-down manner, and the second optical lens at the bottommost side is mounted on the supporting platform, and the top of the lens barrel main body has an opening so that the second optical lens at the topmost side is completely exposed.

4. The split camera lens according to claim 3, wherein a lower end surface of the lens barrel main body is lower than a lower end surface of the second optical lens at the bottommost side.

5. The split camera lens according to claim 3, wherein an upper end surface of the lens barrel main body is higher than an upper end surface of the second optical lens at the topmost side.

6. The split camera lens according to claim 3, wherein an upper end surface of the first optical lens is higher than an upper end surface of the lens barrel main body.

7. The split camera lens according to claim 1, wherein a lateral size of the first optical lens is smaller than a lateral size of the second optical lens at the topmost side.

8. The split camera lens according to claim 1, wherein a lateral size of the second optical lens at the topmost side is larger than a lateral size of the second optical lens at the bottommost side.

9. The split camera lens according to claim 1, wherein the second optical lens at the topmost side includes a mounting platform concavely formed on the upper end surface of the second optical lens, and the mounting platform is configured to mount the first optical lens thereon.

10. The split camera lens according to claim 1, wherein the second optical lens at the topmost side includes a mounting platform protruding and formed on the upper end surface of the second optical lens, and the mounting platform is configured to mount the first optical lens thereon.

11. The split camera lens according to claim 1, wherein the first optical lens includes an optical zone and a structural zone surrounding the optical zone, and the optical zone includes a convex portion protruding and extending from the structural zone.

12. The split camera lens according to claim 11, wherein an upper side of the optical zone is a convex surface, and a lower side opposite to the upper side of the optical zone is a concave surface.

13. The split camera lens according to claim 11, wherein the first optical lens further includes a light shielding layer provided in a non-optical effective zone of the first optical lens.

14. The split camera lens according to claim 13, wherein in case that the lateral size of the first optical lens corresponds to the second optical lens at the topmost side, an area covered by the light shielding layer includes the upper surface and the side surface of the structural zone of the first optical lens, and the sidewall of the convex portion.

15. The split camera lens according to claim 13, wherein in case that the lateral size of the first optical lens is smaller than that of the second optical lens at the topmost side, an area covered by the light shielding layer includes the upper surface and the side surface of the structural zone of the first optical lens, the sidewall of the convex portion, and at least part of the upper surface of the second optical lens at the topmost side.

16. The split camera lens according to claim 14, wherein the light-shielding layer further covers a transition area between the sidewall of the convex portion and the upper surface thereof, and the length of the transition area in a direction from the sidewall of the convex portion to the center of the convex portion is 0.03-0.05 mm.

17. A camera module, characterized by comprising:
the split camera lens according to claim 1; and
a photosensitive assembly, wherein the split camera lens is held on a photosensitive path of the photosensitive assembly.

18. A terminal device, characterized by comprising:
a terminal main body including a display screen; and
a camera module, wherein the camera module includes:
the split camera lens according to claim 1; and
a photosensitive assembly, wherein the split camera lens is held on a photosensitive path of the photosensitive assembly;
wherein the camera module and the display screen are mounted on a same side of the terminal main body so as to be configured as a front camera module;
wherein the display screen has a through hole formed through it, and an inner diameter of the through hole is slightly larger than the lateral size of the convex portion, and in case that the camera module is mounted on a front side of the terminal main body, the convex portion of the first optical lens is fitted into the through hole.

19. The terminal device according to claim 18, wherein the through hole is a stepped hole, so that in case that the camera module and the display screen are mounted on the same side of the terminal main body, the convex portion of the first optical lens and part of the structural zone are fitted into the through hole.

* * * * *